May 15, 1956 — W. P. VON BEHREN — 2,745,644
BOWL SUPPORT FOR PORTABLE FOOD MIXER
Filed July 2, 1953
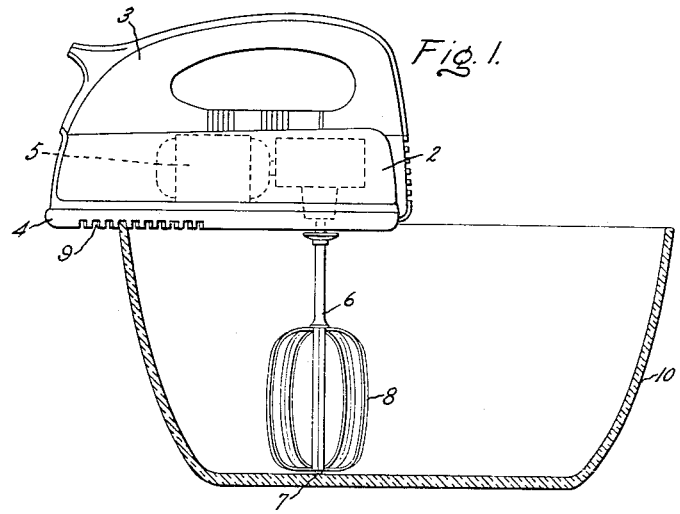
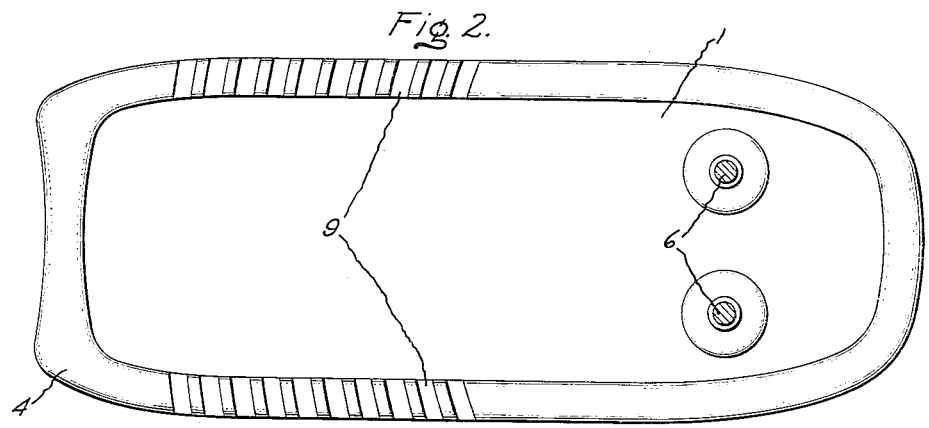
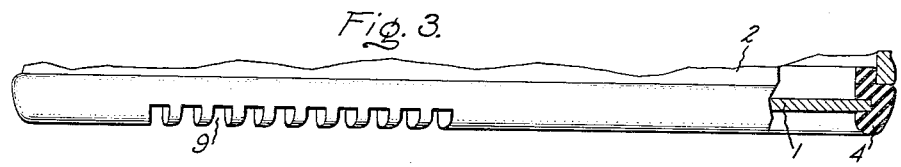
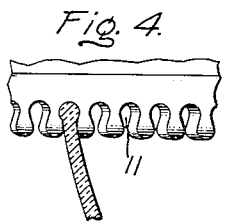
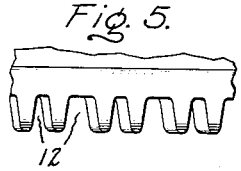
Inventor:
William P. Von Behren,
by Frank L. Neuhauser
His Attorney.

United States Patent Office 2,745,644
Patented May 15, 1956

2,745,644
BOWL SUPPORT FOR PORTABLE FOOD MIXER

William P. Von Behren, Fairfield, Conn., assignor to General Electric Company, a corporation of New York Application July 2, 1953, Serial No. 365,697

2 Claims. (Cl. 259—135)

The present invention relates to electric motor driven food mixers of the type wherein the motor extends horizontally, and especially to small light weight food mixers termed usually portable food mixers. In use such food mixers are intended to be held in the hand as opposed to being mounted on a standard.

The object of the present invitation is to provide in a portable food mixer of the type referred to simple means whereby it may be supported on the edge of a bowl or other receptacle with which it is being used.

According to the invention there is provided on the underside of the food mixer casing or body at the end remote from the beaters, walls which define one or more pairs of transversely extending grooves in which the edge of a mixing bowl may be positioned. The invention is well adapted for use in mixers having a flat bottom casing wall surrounded by a gasket of resilient materials such as rubber, the pairs of grooves being defined by transversely extending slots in the gasket.

In the drawing Fig. 1 is a side elevation of a portable food mixer of the horizontal motor type embodying the invention, the food mixer being shown supported on a mixing bowl.

Fig. 2 is a bottom plan view of the food mixer.

Fig. 3 is a detailed side view partly in section of a part of the mixer.

Figs. 4 and 5 are detailed views showing modifications.

Referring to the drawing, 1 indicates the base of a food mixer, 2 the housing which is supported on the base and 3 the handle. Base 1 is a flat plate and between its peripheral edge and the bottom edge of housing 2 is a gasket 4 formed preferably from a resilient material such as rubber. As shown clearly in Fig. 3 the gasket projects below the bottom surface of base plate 1 forming a flange which surrounds the base. Supported on base 1 within housing 2 and extending longitudinally of the base is a mixer motor 5 which is shown in outline. The motor is horizontally arranged, i. e., its shaft is parallel to base 1, and at its one end, which may be termed its forward end, the shaft is connected through suitable gearing to beaters 6. Beaters 6 may be of usual construction, the lower ends of the beater stems terminating in rounded heads or buttons as indicated at 7 which serve to hold the vanes 8 on the beater shaft.

The structure so far described is a known one, it being substantially that shown in the patent to C. A. Edman, 2,615,942, patented October 28, 1952, and is to be taken as typical of any suitable electric motor driven food mixer of this general type.

According to the invention, there is provided in gasket 4 one or more pairs of oppositely disposed transversely extending grooves 9 located adjacent the end of base plate 1 remote from the end at which beaters 6 are located. The grooves are suitably curved or angled and dimensioned as to width to fit the rims of ordinary mixing bowls of varying sizes. In Figs. 1 to 3, ten pairs of grooves 9 are shown by way of example; and the grooves are curved slightly with the curvatures increasing from the outermost pair of grooves to the innermost thereby adapting the structure for use with bowls having a considerable range in rim diameters, that is, the radius of curvature of the pairs of grooves increases as we proceed from the beater end of the mixer toward the end remote therefrom.

The manner in which the invention is utilized will be clear from Fig. 1 where the mixer is shown supported on the rim of a bowl 10. When thus positioed the heads 7 at the lower ends of the beaters rest against the bottom of the bowl and the mixer body is supported on the rim of the bowl and is held on the edge of the rim by a pair of grooves 9 in which the rim is located. There is thus provided what in the present instance is a four-point support for the mixer, two points where the beaters rest on the bottom of the bowl and two points where the gasket engages the rim of the bowl.

To adapt the structure for use with bowls of varying diameters the curvatures or angles of successive pairs of grooves may be graduated as shown particularly in Fig. 2. By adopting suitable groove angles or curvatures and groove widths the structure may be adapted for use with a wide variety of different bowl sizes.

Instead of the teeth which define the grooves 9 being of uniform width as shown in Figs. 1 to 3, they may be shaped as shown at 11 in Fig. 4; and if desired they may be graduated in spacing to provide grooves of varying widths as shown at 12 in Fig. 5.

The invention may be carried out in connection with a mixer which already has a gasket, such as the gasket 4, at little additional cost since it is necessary merely to mold the gasket with pairs of grooves of the desired dimensions. This represents a most advantageous feature of the invention since by the simple expedient of providing the supporting grooves the mixer is given additional utility.

What I claim as new and desire to secure by Letters Patent of the United States is:

1. In an electric motor driven food mixer of the portable type having an elongated casing, a motor therein, and beaters at the one end of the casing driven by the motor, means for supporting the food mixer on the edge of a mixing bowl with the lower ends of the beaters resting on the bottom of a bowl comprising a wall on the underside of the casing at the end remote from the beaters, said wall having a plurality of transversely extending longitudinally spaced grooves in which a bowl rim may be positioned.

2. An electric motor driven food mixer as defined in claim 1 wherein the bottom wall includes a gasket of resilient material which projects below the surface of such bottom wall and the grooves are formed in said gasket and are defined by a plurality of pairs of transversely extending curved slots in the gasket and wherein the radius of curvature of said pairs of slots increases progressively from the beater end toward the end remote from the beaters.

References Cited in the file of this patent
UNITED STATES PATENTS

| | | |
|---|---|---|
| 1,982,254 | Juengling | Nov. 27, 1934 |
| 2,578,901 | Schmidt | Dec. 18, 1951 |
| 2,615,942 | Edman | Oct. 28, 1952 |